(12) United States Patent
Ishimoto

(10) Patent No.: US 6,999,168 B2
(45) Date of Patent: Feb. 14, 2006

(54) SPECTROPHOTOMETER

(75) Inventor: Junki Ishimoto, Otsu (JP)

(73) Assignee: Shimadzu Corporation, Kyoto (JP)

( * ) Notice: Subject to any disclaimer, the term of this patent is extended or adjusted under 35 U.S.C. 154(b) by 46 days.

(21) Appl. No.: 10/857,706

(22) Filed: May 28, 2004

(65) Prior Publication Data

US 2004/0239927 A1    Dec. 2, 2004

(30) Foreign Application Priority Data

May 29, 2003   (JP) .............................. 2003-151732

(51) Int. Cl.
*G01J 3/42*   (2006.01)
(52) U.S. Cl. ...................... 356/319; 356/328
(58) Field of Classification Search ............... 356/319, 356/323, 325, 326, 328
See application file for complete search history.

(56) References Cited

U.S. PATENT DOCUMENTS 4,703,437 A * 10/1987 Nishimura .................. 356/319

\* cited by examiner

*Primary Examiner*—F. L. Evans
(74) *Attorney, Agent, or Firm*—Rankin, Hill, Porter & Clark LLP

(57) ABSTRACT

An external signal detection circuit is installed in a new measuring section, and generation and end timing of a readout signal of a spectrometric detector is directly controlled, and a readout signal in synchronization with an external start signal is generated. After input of measurement standby instructions, the external start signal is monitored anytime. Before detection of the external start signal, the new measuring section is shifted to a pause state and after the detection of the external start signal, transition to a measurement state is made. By this configuration, delay time between input time of the external start signal and readout start time of data is defined and valid measurable time at the time of setting short storage time is increased.

2 Claims, 2 Drawing Sheets

EXTERNAL START SIGNAL

SPECTROPHOTOMETER

BACKGROUND OF THE INVENTION

1. Field of the Invention

The present invention relates to an optical device such as a spectrophotometer or a detector for a liquid chromatography.

2. Description of the Related Art

In a related art, a spectrophotometer comprises a light source section for irradiating a sample to be measured with light, a sample section for holding a sample to be measured and ensuring light irradiation, a spectral section for dispersing light transmitting the sample, a measuring section for measuring an intensity distribution state etc. of the dispersed light, and a control section for driving signals of this measuring section.

Specifically, it is configured as shown in FIG. 2. A configuration of the related-art spectrophotometer and configurations and function of a measuring section and a control section will be described below by this FIG. 2 and Table 1 showing measurement steps. In FIG. 2, numeral 1 is a halogen lamp, and numeral 2 is a deuterium lamp. Light from both the lamps 1, 2 is switched by a switching plate 3 and a sample compartment 5 is irradiated with the light through a lens 4. Portions to this irradiation system construct a light source section. The light from the light source section passes through a lens 6 and is led to a grating 8 via an inlet slit 7 and is dispersed. A spectral section is constructed of the lens 6, the inlet slit 7, the grating 8 and so on. The dispersed light is detected by a spectrometric detector 9. Incidentally, the spectrometric detector 9 is constructed of a multi-channel serial readout type of device such as a self-scanned photodiode array. Then, an output from this spectrometric detector 9 is inputted to a measuring section M comprising a signal processing circuit 10, an A/D converter 11, a DSP (digital signal processor) 12 and a detector driving circuit 13. Further, this measuring section M is connected to a control section C comprising a CPU (central processing unit) 14, an external signal detection circuit 15 and a PC (personal computer) 16. Also, the control section C is connected to an external device 17 of the outside and is remotely controlled specifically.

Next, measurement by this spectrophotometer will be described specifically. Light generated in the deuterium lamp 2 which is a lamp for detection passes through the switching plate 3 and the lens 4, and receives light absorption by a sample (not shown) inside the sample compartment 5, and is read out of the spectrometric detector 9 as an intensity distribution signal (hereinafter called data). In FIG. 2, the switching plate 3 shows the case of a half mirror, but has a structure capable of performing switching of three kinds of a shutter of light blocking, a half mirror for superimposing light of the halogen lamp 1 and the deuterium lamp 2, a through for passing through only light of the deuterium lamp 2 for any purpose. As necessary, by switching of the switching plate 3, the light from the deuterium lamp 2 is led to the spectrometric detector 9 and an emission line wavelength is detected to define a wavelength.

In a measurement start of the spectrophotometer, there are the case that a measurer inputs a measurement start signal to the spectrophotometer by a keyboard operation directly and the case that a measurement start signal is inputted from the external device 17 of the outside of the spectrophotometer after a measurer inputs measurement standby instructions to the spectrophotometer. As shown in Table 1, at a point in time of measurement standby instruction input, the measuring section M is in a self-scanned state (readout state). Once the measuring section M shifts to the self-scanned state, data readout processing from the spectrometric detector 9 has precedence over instructions from the control section C, so that the data readout from the spectrometric detector 9 cannot be suspended on the way.

A function (hereinafter called a monitoring function) of monitoring and detecting a measurement start signal (hereinafter called an external start signal) given from the external device 17 present in the outside of the spectrophotometer is provided inside the control section C. Since the monitoring function acts periodically, there is a period during which monitoring stops. In a measurement standby state, the measuring section M is in a self-scanned state of periodically repeatedly reading data out of the spectrometric detector independently of the external start signal. Steps (action outline) of the case that the external start signal outputted by the external device 17 is inputted to the spectrophotometer and measurement using the external start signal as a starting point is made are shown in Table 1.

TABLE 1

| Step | External Event | Control section C | Measuring section M |
|---|---|---|---|
| 1 |  | Measurement Standby Instruction Wait State | Self-scanned State |
| 2 | Measurement Standby Instruction Input | Measurement Standby Instruction Detection |  |
| 3 |  | Transition to Monitoring State |  |
| 4 |  | Instruct Measuring section M on Transition to Measurement State |  |
| 5 | External Start Signal Input | External Start Signal Detection | Transition to Measurement State |
| 6 |  | Transition to Data Receiving Wait State from Measuring section M |  |
| 7 |  | Transition to Data Processing State |  |
| 8 |  | Return to Measurement Standby Instruction Wait State | Return to Self-scanned State |

That is, in Table 1, steps 1 to 4 are measurement standby steps, and step 5 and subsequent steps are measurement steps using an external start signal as a starting point. In steps 1 to 4, the measuring section M is in a self-scanned state, and data is periodically repeatedly readout of the spectrometric detector 9 anytime every period of a readout start signal and a readout clock (hereinafter collectively called a readout signal) outputted to the spectrometric detector 9, and the data is repeatedly stored for a certain time (hereinafter called storage time) which is shorter than or equal to the period of the readout signal, but is not outputted until step 7. The external start signal is inputted from the external device 17 to the external signal detection circuit 15 and a control signal (instructions on transition to a measurement state) is outputted. Incidentally, in Table 1, an external start signal is inputted after measurement standby instruction input, but in some cases, a spectrophotometer independently may start measurement of change with time before the external device 17 acts. A related-art spectrophotometer does not have a function of setting wait time from an external start signal to an actual measurement start.

In Table 1, "measurement standby instruction wait state" means a state of waiting for input of measurement standby instructions by a measurer from a panel key etc. of a spectrophotometer or software of the PC 16 of FIG. 2, and "monitoring state" means a state of waiting for an external start signal of FIG. 2. Also, "data receiving wait state" means a state in which it is checked whether or not there is data sent from the measuring section M and if so, readout of data, calculation of data, temporary retention, display and sending of data are performed, and in parallel with that, a state of periodically monitoring whether or not to satisfy conditions for ending a measurement action, for example, whether or not time specified by a measurer has elapsed since a measurement start and whether or not a measurer has instructed a measurement end by inputting a signal from a key allocated to the measurement end, etc., and "self-scanned state" means a state in which readout data from the spectrometric detector 9 is regarded as invalid and is not outputted although a readout signal is outputted to the spectrometric detector 9 of FIG. 2. Then, "measurement state" means a state in which a readout signal is outputted to the spectrometric detector 9 and readout data from the spectrometric detector 9 is regarded as valid and is outputted.

The configuration and function of the related-art spectrophotometer are described above. In the related-art spectrophotometer, once the measuring section M shifts to a readout state, data readout processing from the spectrometric detector 9 has precedence over instructions from the control section C, so that the readout cannot be suspended on the way. As a result of that, generation time of a control signal cannot be synchronized with generation time of some readout signal repeated periodically. The first data after output of the control signal is discarded because there is a possibility that storage is started before the generation time of the control signal, and the second or below data is outputted, but indefinite delay time due to the a synchronism described above occurs, so that time of a difference between start time of storage of the second data and the generation time of the control signal cannot be defined. As described above, even in a measurement standby instruction wait state, readout is performed anytime, so that in the case of presetting short storage time (a readout clock of a short period) in order to observe a rapid change in time, the number of data per unit time increases and valid measurable time decreases due to capacity etc. of a memory device and a memory element inside a DSP. Also, when the spectrophotometer independently starts measurement of change with time before the external device 17 acts, there is a need for processing in which while a measurer observes the degree of change in measured data after the end of measurement, the time origin is presumed and unnecessary data before the external device 17 acts is discarded.

SUMMARY OF THE INVENTION

An object of the present invention is to provide a spectrophotometer in which an external signal detection circuit present in a control section in the related art is shifted to a measuring section and an external start signal is monitored anytime and generation and end timing of a readout signal is directly controlled by the external start signal.

That is, there are provided a spectrophotometer comprising:

a detection element for detecting an intensity distribution of a dispersed light;

a first section for setting and controlling a period of a readout signal to be outputted to the detection element in order for the detection element to read out an intensity distribution signal;

a second section for performing a signal processing to the intensity distribution signal read out; and a third section for monitoring the presence or absence of a measurement start signal from the outside and holding the detection element in a pause state in a wait state of the measurement start signal, and controlling the first section to output the readout signal to the detection element after a preset wait time or instantly since a point in time of receiving the measurement start signal from the outside.

The spectrophotometer may further comprise a fourth section for clocking the time since the point in time of receiving the measurement start signal from the outside.

Therefore, it is shifted to a pause state in which a readout signal is not outputted to a spectrometric detector, and after preset wait time or instantly since a point in time of recognizing an external start signal, transition to a measurement state in which a readout signal is outputted to the spectrometric detector is made.

DETAILED DESCRIPTION OF THE INVENTION

Figure 1:
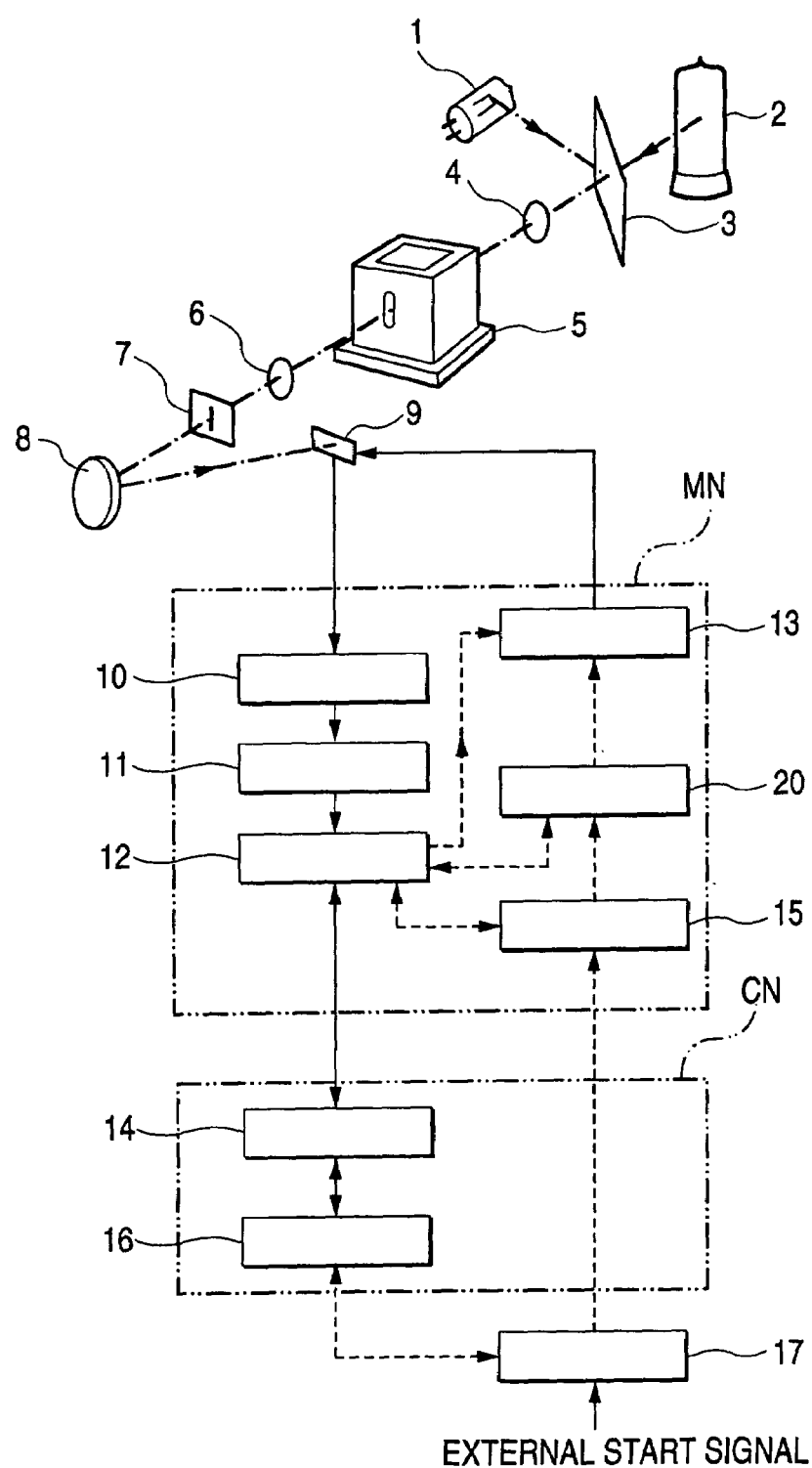
FIG. 1 is a diagram showing a configuration of a spectrophotometer of the invention.
Figure 2:
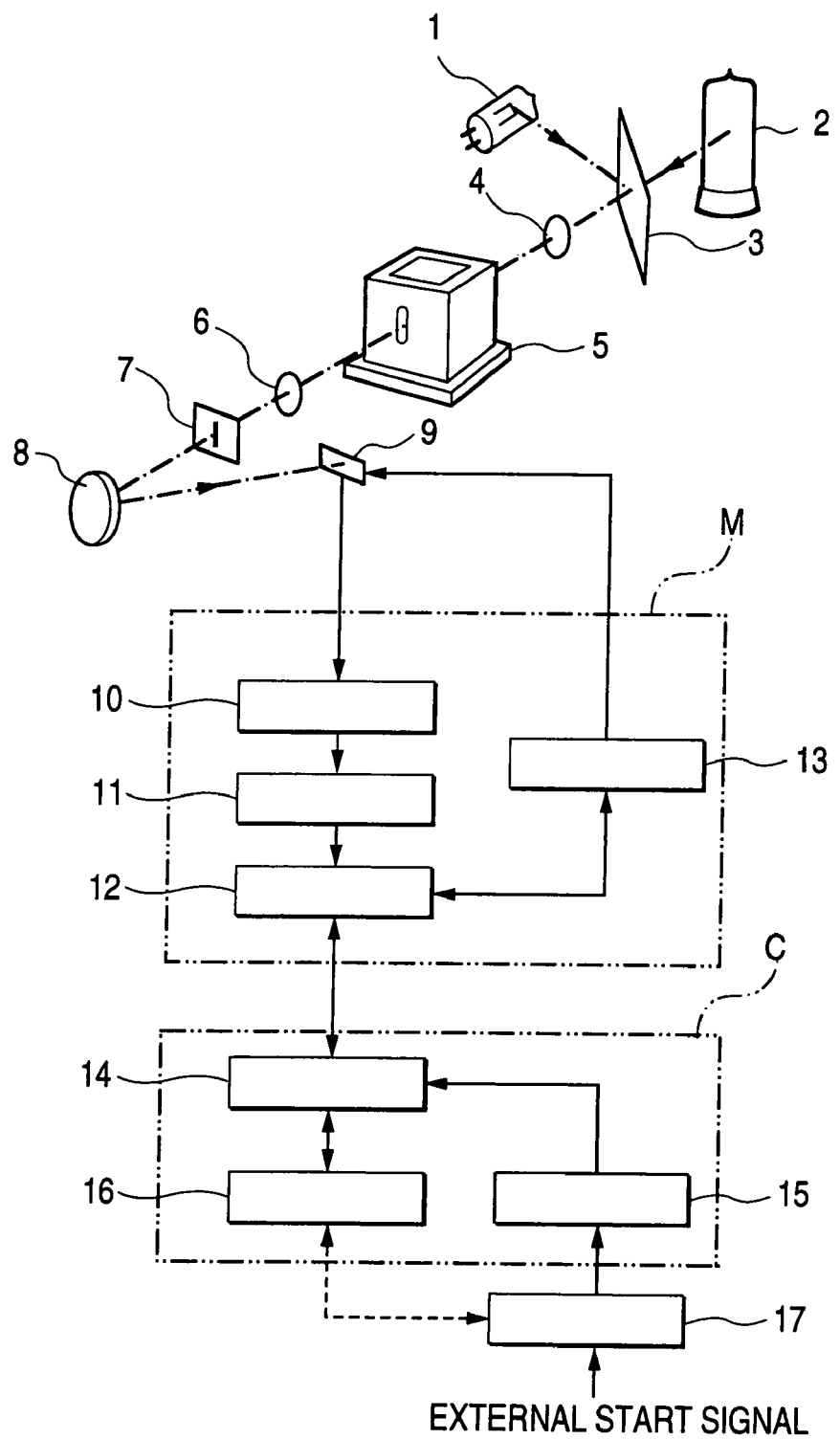
FIG. 2 is a diagram showing a configuration of a related-art spectrophotometer.

A spectrophotometer of the invention will be described below according to an embodiment shown in FIG. 1 and Table 2. In FIG. 1, components 1 to 9 are the same as those of FIG. 2, so that detailed description is omitted. A spectrometric detector 9 is connected to a new measuring section MN comprising a signal processing circuit 10, an A/D converter 11, a DSP (digital signal processor) 12, a detector driving circuit 13, an external signal detection circuit 15 and a clocking circuit 20. The new measuring section MN is connected to a new control section CN comprising a CPU 14 and a PC (personal computer) 16. The external signal detection circuit 15 present in a control section C of FIG. 2 is shifted to the new measuring section MN and is connected to the detector driving circuit 13 through only the clocking circuit 20. The new control section CN is connected to an external device 17.

As described above, the external signal detection circuit 15 present in the new measuring section MN is connected to the detector driving circuit 13 through only the clocking circuit 20 and directly controls output and non-output of a readout signal of the spectrometric detector to the detector driving circuit 13. In a measurement standby instruction wait state, a readout signal is not outputted to the spectrometric detector 9 and the new measuring section MN is in a pause state and readout of useless data can be blocked. The detector driving circuit 13 makes transition to a measurement state of outputting a readout signal to the spectrometric detector 9 after standby for a preset time or instantly since a point in time when the external signal detection circuit 15 detects an external signal from the external device 17. The clocking circuit 20 clocks the time since the point in time when the external signal detection circuit 15 detects the external signal. An action outline of the case that an external start signal outputted by the external device 17 is inputted to the spectrophotometer and measurement using the external start signal as a starting point is made is shown in Table 2.

TABLE 2

| Step | External Event | New Control section CN | New Measuring section MN |
|------|----------------|------------------------|--------------------------|
| 1 | | Measurement Standby Instruction Wait State | Pause State |
| 2 | Measurement Standby Instruction Input | Measurement Standby Instruction Detection | |
| 3 | | Instruct New Measuring section MN on Transition to Monitoring State | |
| 4 | | Transition to Data Receiving Wait State from New Measuring section MN | Transition to Monitoring State |
| 5 | External Start Signal Input | | External Start Signal Detection |
| 6 | | | Standby for Certain Time Preset |
| 7 | | | Transition to Measurement State |
| 8 | | Measurement End Condition Wait | |
| 9 | | Instruct New Measuring section MN on Transition to Pause State | |
| 10 | | Return to Measurement Standby Instruction Wait State | Return to Pause State |

That is, in Table 2, steps 1 to 4 are measurement standby steps, and step 5 and subsequent steps are measurement steps using an external start signal as a starting point. Step 1 shows a state in which a spectrophotometer is turned on and warm-up is completed, and the new control section CN is in a measurement standby instruction wait state, and the new measuring section MN is in a pause state. The measurement standby instruction wait state is a state in which the new control section CN waits for measurement standby instructions from a measurer inputted via a panel key etc. of the spectrophotometer or software of the PC 16. The pause state is a state in which a readout signal is not inputted to the spectrometric detector 9 and readout of unnecessary data is blocked. When measurement standby instructions are inputted in step 2, the new control section CN detects the measurement standby instructions and in step 3, the new measuring section MN is instructed on transition to a monitoring state of monitoring an external start signal anytime. In step 4, the new control section CN makes transition to a data receiving wait state. In the data receiving wait state, the new control section CN checks whether or not there is data sent from the new measuring section MN and if so, readout of data, calculation of data, temporary retention, display and sending of data are performed and also in parallel with that, the new control section CN periodically monitors whether or not time specified by a measurer has elapsed since a measurement start and whether or not a measurer has instructed a measurement end by a method for inputting a signal from a key allocated to the measurement end, etc. Also, the new measuring section MN makes transition to a monitoring state and waits for the external start signal.

When the external start signal is inputted from the external device 17 to the external signal detection circuit 15 of the new measuring section MN in step 5, standby for a certain time preset is performed in step 6. After the end of the standby for the certain time, in step 7, the new measuring section MN makes transition to a measurement state and measurement is started. In the measurement state, a readout signal is outputted from the detector driving circuit 13 to the spectrometric detector 9 and data from the spectrometric detector 9 is read out. Incidentally, in the case of setting wait time to zero, measurement is instantly started actually.

In step 8, the measurement is continued and also the new control section CN periodically monitors conditions for ending a measurement action (for example, the presence or absence of measurement end instructions of a measurer), and waits. In the case of satisfying the measurement end conditions, the new control section CN instructs the new measuring section MN on transition to a pause state in step 9. In step 10, the new control section CN returns to the measurement standby instruction wait state and the new measuring section MN returns to the pause state and they return to step 1.

In Table 2, "measurement standby instruction wait state" means a state of waiting for input of measurement standby instructions from a measurer by a panel key etc. of a spectrophotometer or software of the PC 16 of FIG. 1, and "monitoring state" means a state of waiting for an external start signal of FIG. 1. Also, "data receiving wait state" means a state in which it is checked whether or not there is data sent from the new measuring section MN and if so, readout of data, calculation of data, temporary retention, display and sending of data are performed, and a state of periodically monitoring whether or not to satisfy conditions for ending a measurement action, for example, whether or not time specified by a measurer has elapsed since a measurement start in parallel with that and whether or not a measurer has instructed a measurement end by inputting a signal from a key allocated to the measurement end, etc. "measurement state" means a state in which a readout signal is outputted to the spectrometric detector 9 of FIG. 1 and readout data from the spectrometric detector 9 is regarded as valid and is outputted. "pause state" means a state in which a readout signal is not outputted to the spectrometric detector 9.

The spectrophotometer of the invention is not limited to the embodiment described above, and various modified embodiments can be given. For example, since the first data regarded as invalid is always ignored, quality of the data does not matter, so that delay time can be shortened in the case of being set to very short clock time only at the time of the first readout. Also, addition of a function capable of inputting a measurement end signal from the outside separately from an external start signal enables a configuration in which the measurement end is instructed from an external device. A function capable of setting time from an external start signal input to a measurement stop in the spectrophotometer before a measurement start can also be added.

Further, in the case of adding a function capable of setting the number of measured data or measurement time with respect to one sample before a measurement start, and a function of automatically returning from a measurement state to an external signal wait state after the end of measurement of one sample, or a function of automatically returning from a measurement state to an external signal wait state by receiving a measurement end signal of one sample from the external device 17, the same measurement of change with time can be repeated automatically with respect to plural samples or measurement of change with time associated with processing over plural times of a measured sample, for example, reagent addition of plural times, can be made. Also, in such applications that a unit of time for observing change with time may be storage time itself, the number of data made invalid may be specified instead of wait time.

THE INVENTION INCLUDES ALL OF THESE

In addition, the present invention is not limited to the spectrophotometer described in the embodiment, and for example, the present invention can be applied to a detector for a liquid chromatography. In this case, a flow cell is used in place of the sample compartment 5. A sample to be measured is supplied to the flow cell via a column by a mobile phase. A change of absorbance to the time of the sample to be measured flowing the flow cell is measured using the optical device of the present invention as the detector for the liquid chromatography so as to obtain a liquid chromatogram.

Since the invention has been described above in detail, generation time of a readout signal generated by an detector driving circuit in synchronization with an external start signal is determined by input time of the external start signal and an external signal detection circuit is directly connected to the detector driving circuit through only a clocking circuit, so that delay time is also shortened. The first data is discarded in a manner similar to the related art, but delay time from input of the external start signal to an acquisition start of the second valid data becomes a constant value unlike the related art. By synchronization, data is always read out of the first pixel of a spectrometric detector. Also, delay time from the external start signal to a data output start can be set arbitrarily, so that change in time of absorbance of a substance changing rapidly after a lapse of a certain time, for example, mixture of samples by a stop and flow method can be usefully measured with high accuracy of time. In the modified embodiment, in the case of repeating plural measurements intermittently, a new measuring section becomes a pause state completely at intervals between the measurements, so that time allocated to processing, transmission, etc. of data can be increased as compared with the case of making continuous measurement.

What is clamed is:

1. A spectrophotometer comprising:
   a detection element for detecting an intensity distribution of a dispersed light;
   a first section for setting and controlling a period of a readout signal to be outputted to the detection element in order for the detection element to read out an intensity distribution signal;
   a second section for performing a signal processing to the intensity distribution signal read out; and
   a third section for monitoring the presence or absence of a measurement start signal from the outside and holding the detection element in a pause state in a wait state of the measurement start signal, and controlling the first section to output the readout signal to the detection element after a preset wait time or instantly since a point in time of receiving the measurement start signal from the outside.

2. The spectrophotometer according to claim 1, further comprising:
   a fourth section for clocking the time since the point in time of receiving the measurement start signal from the outside.

* * * * *